United States Patent
Henry et al.

(10) Patent No.: US 7,546,446 B2
(45) Date of Patent: Jun. 9, 2009

(54) SELECTIVE INTERRUPT SUPPRESSION

(75) Inventors: Glenn Henry, Austin, TX (US); Rodney Hooker, Austin, TX (US); Terry Parks, Austin, TX (US)

(73) Assignee: IP-First, LLC, Fremont, CA (US)

( * ) Notice: Subject to any disclaimer, the term of this patent is extended or adjusted under 35 U.S.C. 154(b) by 353 days.

(21) Appl. No.: 10/384,390

(22) Filed: Mar. 10, 2003

(65) Prior Publication Data

US 2003/0221091 A1 Nov. 27, 2003

Related U.S. Application Data (60) Provisional application No. 60/363,116, filed on Mar. 8, 2002.

(51) Int. Cl.
G06F 9/00 (2006.01)
G06F 13/24 (2006.01)

(52) U.S. Cl. ...................... 712/244; 710/262

(58) Field of Classification Search ............. 710/262, 710/266
See application file for complete search history.

(56) References Cited

U.S. PATENT DOCUMENTS

| | | | |
|---|---|---|---|
| 3,657,705 A | | 4/1972 | Mekota et al. |
| 4,064,554 A | | 12/1977 | Tubbs |
| 4,217,638 A | | 8/1980 | Namimoto et al. |
| 4,547,849 A | * | 10/1985 | Louie et al. ............. 710/3 |
| 4,851,995 A | | 7/1989 | Hsu et al. |
| 5,029,069 A | | 7/1991 | Sakamura |
| 5,142,679 A | | 8/1992 | Owaki et al. |
| 5,218,712 A | * | 6/1993 | Cutler et al. ............. 710/261 |
| 5,448,744 A | | 9/1995 | Eifert et al. |
| 5,471,595 A | * | 11/1995 | Yagi et al. ............... 712/244 |

(Continued)

FOREIGN PATENT DOCUMENTS

CN 1431584 7/2003

(Continued)

OTHER PUBLICATIONS

Paap et al, "Power PC™: A Performance Architecture," COMPCON Spring '93, Digest of Papers, San Francisco, CA, IEEE Computer Society, Feb. 22, 1993, pp. 104-108.

(Continued)

*Primary Examiner*—Eddie P Chan
*Assistant Examiner*—Jacob Petranek
(74) *Attorney, Agent, or Firm*—Richard K. Huffman; James W. Huffman (57) ABSTRACT

An apparatus and method are provided for extending a microprocessor instruction set to allow for selective suppression of interrupts at the instruction level. The apparatus includes translation logic and extended execution logic. The translation logic translates an extended instruction into corresponding micro instructions. The extended instruction has and extended prefix and an extended prefix tag. The extended prefix specifies that interrupt processing be suppressed until execution of the extended instruction is completed, where the extended instruction prescribes an operation to be performed according to an existing instruction set. The extended prefix tag is an otherwise architecturally specified opcode within an existing instruction set. The extended execution logic is coupled to the translation logic. The extended execution logic receives the corresponding micro instructions, and completes execution of the corresponding micro instructions prior to processing a pending interrupt.

30 Claims, 6 Drawing Sheets

U.S. PATENT DOCUMENTS

| | | | |
|---|---|---|---|
| 5,481,684 A | | 1/1996 | Richter et al. |
| 5,687,338 A | | 11/1997 | Boggs et al. |
| 5,751,996 A | | 5/1998 | Glew et al. |
| 5,768,574 A | | 6/1998 | Dutton et al. |
| 5,778,220 A | | 7/1998 | Abramson et al. |
| 5,796,973 A | | 8/1998 | Witt et al. |
| 5,822,778 A | | 10/1998 | Dutton et al. |
| 5,826,089 A | * | 10/1998 | Ireton .................. 717/146 |
| 5,857,103 A | | 1/1999 | Grove |
| 5,870,619 A | | 2/1999 | Wilkinson et al. |
| 5,875,342 A | | 2/1999 | Temple |
| 5,913,049 A | | 6/1999 | Shiell et al. |
| 5,937,199 A | | 8/1999 | Temple |
| 5,991,872 A | | 11/1999 | Shiraishi et al. |
| 6,014,735 A | * | 1/2000 | Chennupaty et al. ........ 712/210 |
| 6,029,222 A | * | 2/2000 | Kamiya ................... 710/262 |
| 6,058,472 A | | 5/2000 | Panwar et al. |
| 6,085,312 A | | 7/2000 | Abdallah et al. |
| 6,157,996 A | | 12/2000 | Christie et al. |
| 6,199,155 B1 | | 3/2001 | Kishida et al. |
| 6,230,259 B1 | | 5/2001 | Christie et al. |
| 6,317,822 B1 | | 11/2001 | Padwekar |
| 6,351,806 B1 | | 2/2002 | Wyland |
| 6,405,305 B1 | | 6/2002 | Meier et al. |
| 6,434,693 B1 | | 8/2002 | Senter et al. |
| 6,456,891 B1 | | 9/2002 | Kranich et al. |
| 6,542,985 B1 | | 4/2003 | Johnson et al. |
| 6,549,999 B2 | | 4/2003 | Kishida et al. |
| 6,560,694 B1 | | 5/2003 | McGrath et al. |
| 6,581,154 B1 | * | 6/2003 | Zaidi ..................... 712/210 |
| 6,647,488 B1 | | 11/2003 | Takeno et al. |
| 6,751,737 B1 | | 6/2004 | Russell et al. |
| 6,779,103 B1 | | 8/2004 | Alexander, III et al. |
| 6,823,414 B2 | * | 11/2004 | Radhakrishna ............. 710/262 |
| 6,883,053 B2 | * | 4/2005 | Shinagawa et al. .......... 710/263 |
| 7,130,951 B1 | * | 10/2006 | Christie et al. ............... 710/261 |
| 7,181,596 B2 | | 2/2007 | Henry et al. |
| 2001/0013870 A1 | | 8/2001 | Pentkovski et al. |
| 2002/0194457 A1 | | 12/2002 | Akkary |
| 2003/0159020 A1 | | 8/2003 | Henry et al. |
| 2003/0172252 A1 | | 9/2003 | Henry et al. |
| 2003/0188130 A1 | | 10/2003 | Henry et al. |
| 2004/0268090 A1 | | 12/2004 | Coke et al. |
| 2005/0102492 A1 | | 5/2005 | Henry et al. |
| 2005/0188179 A1 | | 8/2005 | Henry et al. |

FOREIGN PATENT DOCUMENTS

| | | |
|---|---|---|
| EP | 0550289 A | 7/1993 |
| EP | 0942359 A | 9/1999 |
| EP | 0947919 A | 10/1999 |
| WO | WO-9722922 A1 | 6/1997 |

OTHER PUBLICATIONS

Silberman et al. *An Architectural Framework for Supporting Heterogeneous Instruction-Set Architectures.* Computer, IEEE Computer Society, Long Beach, CA, US vol. 26, No. 6 Jun. 1, 1993. pp. 39-56. ISSN: 0018-0162.

Intel Architecture Software Developer's Manual, vol. 2: Instruction Set Reference, 1999. pp. 2-1 to 2-4, 3-332, 3-353 and B25.

Patterson & Hennessy. "Computer Organization and Design: The Hardware/Software Interface." 1998. Morgan Kaufmann Publishers, Inc. Second Edition. pp. 177-178, 297.

Dobb. "Microprocessor Resources." 2000. http://web.archive.org/web/20000118231610 http://x86.org/secrets/opcodes/icebp.htm.

Richard L. Sites. "Alpha AXP Architecture." Communications of the Association for Computing Machinery, ACM. New York, NY. vol. 36, No. 2. Feb. 1, 1993. pp. 33-44. XP000358264. ISSN: 0001-0782.

* cited by examiner

*Fig. 1 (Prior Art)*

*Microprocessor Instruction Format*

*Fig. 2 (Prior Art)*

*8-Bit Opcode Map*

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | I00 | I01 | I02 | I03 | I04 | I05 | I06 | I07 | I08 | I09 | I0A | I0B | I0C | I0D | I0E | I0F |
| 1 | I10 | I11 | I12 | I13 | I14 | I15 | I16 | I17 | I18 | I19 | I1A | I1B | I1C | I1D | I1E | I1F |
| 2 | I20 | I21 | I22 | I23 | I24 | I25 | I26 | I27 | I28 | I29 | I2A | I2B | I2C | I2D | I2E | I2F |
| 3 | I30 | I31 | I32 | I33 | I34 | I35 | I36 | I37 | I38 | I39 | I3A | I3B | I3C | I3D | I3E | I3F |
| 4 | I40 | I41 | I42 | I43 | I44 | I45 | I46 | I47 | I48 | I49 | I4A | I4B | I4C | I4D | I4E | I4F |
| 5 | I50 | I51 | I52 | I53 | I54 | I55 | I56 | I57 | I58 | I59 | I5A | I5B | I5C | I5D | I5E | I5F |
| 6 | I60 | I61 | I62 | I63 | I64 | I65 | I66 | I67 | I68 | I69 | I6A | I6B | I6C | I6D | I6E | I6F |
| 7 | I70 | I71 | I72 | I73 | I74 | I75 | I76 | I77 | I78 | I79 | I7A | I7B | I7C | I7D | I7E | I7F |
| 8 | I80 | I81 | I82 | I83 | I84 | I85 | I86 | I87 | I88 | I89 | I8A | I8B | I8C | I8D | I8E | I8F |
| 9 | I90 | I91 | I92 | I93 | I94 | I95 | I96 | I97 | I98 | I99 | I9A | I9B | I9C | I9D | I9E | I9F |
| A | IA0 | IA1 | IA2 | IA3 | IA4 | IA5 | IA6 | IA7 | IA8 | IA9 | IAA | IAB | IAC | IAD | IAE | IAF |
| B | IB0 | IB1 | IB2 | IB3 | IB4 | IB5 | IB6 | IB7 | IB8 | IB9 | IBA | IBB | IBC | IBD | IBE | IBF |
| C | IC0 | IC1 | IC2 | IC3 | IC4 | IC5 | IC6 | IC7 | IC8 | IC9 | ICA | ICB | ICC | ICD | ICE | ICF |
| D | ID0 | ID1 | ID2 | ID3 | ID4 | ID5 | ID6 | ID7 | ID8 | ID9 | IDA | IDB | IDC | IDD | IDE | IDF |
| E | IE0 | IE1 | IE2 | IE3 | IE4 | IE5 | IE6 | IE7 | IE8 | IE9 | IEA | IEB | IEC | IED | IEE | IEF |
| F | IF0 | IF1 | IF2 | IF3 | IF4 | IF5 | IF6 | IF7 | IF8 | IF9 | IFA | IFB | IFC | IFD | IFE | IFF |

Fig. 3

*Extended Instruction Format*

Fig. 4

*8-Bit Extended Prefix Map*

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | E00 | E01 | E02 | E03 | E04 | E05 | E06 | E07 | E08 | E09 | E0A | E0B | E0C | E0D | E0E | E0F |
| 1 | E10 | E11 | E12 | E13 | E14 | E15 | E16 | E17 | E18 | E19 | E1A | E1B | E1C | E1D | E1E | E1F |
| 2 | E20 | E21 | E22 | E23 | E24 | E25 | E26 | E27 | E28 | E29 | E2A | E2B | E2C | E2D | E2E | E2F |
| 3 | E30 | E31 | E32 | E33 | E34 | E35 | E36 | E37 | E38 | E39 | E3A | E3B | E3C | E3D | E3E | E3F |
| 4 | E40 | E41 | E42 | E43 | E44 | E45 | E46 | E47 | E48 | E49 | E4A | E4B | E4C | E4D | E4E | E4F |
| 5 | E50 | E51 | E52 | E53 | E54 | E55 | E56 | E57 | E58 | E59 | E5A | E5B | E5C | E5D | E5E | E5F |
| 6 | E60 | E61 | E62 | E63 | E64 | E65 | E66 | E67 | E68 | E69 | E6A | E6B | E6C | E6D | E6E | E6F |
| 7 | E70 | E71 | E72 | E73 | E74 | E75 | E76 | E77 | E78 | E79 | E7A | E7B | E7C | E7D | E7E | E7F |
| 8 | E80 | E81 | E82 | E83 | E84 | E85 | E86 | E87 | E88 | E89 | E8A | E8B | E8C | E8D | E8E | E8F |
| 9 | E90 | E91 | E92 | E93 | E94 | E95 | E96 | E97 | E98 | E99 | E9A | E9B | E9C | E9D | E9E | E9F |
| A | EA0 | EA1 | EA2 | EA3 | EA4 | EA5 | EA6 | EA7 | EA8 | EA9 | EAA | EAB | EAC | EAD | EAE | EAF |
| B | EB0 | EB1 | EB2 | EB3 | EB4 | EB5 | EB6 | EB7 | EB8 | EB9 | EBA | EBB | EBC | EBD | EBE | EBF |
| C | EC0 | EC1 | EC2 | EC3 | EC4 | EC5 | EC6 | EC7 | EC8 | EC9 | ECA | ECB | ECC | ECD | ECE | ECF |
| D | ED0 | ED1 | ED2 | ED3 | ED4 | ED5 | ED6 | ED7 | ED8 | ED9 | EDA | EDB | EDC | EDD | EDE | EDF |
| E | EE0 | EE1 | EE2 | EE3 | EE4 | EE5 | EE6 | EE7 | EE8 | EE9 | EEA | EEB | EEC | EED | EEE | EEF |
| F | EF0 | EF1 | EF2 | EF3 | EF4 | EF5 | EF6 | EF7 | EF8 | EF9 | EFA | EFB | EFC | EFD | EFE | EFF |

*Extended Prefix for Suppression of Interrupts*

*Execute Stage Details*

SELECTIVE INTERRUPT SUPPRESSION

CROSS-REFERENCE TO RELATED APPLICATIONS

This application claims the benefit of U.S. Provisional Application No. 60/363,116 filed on Mar. 8, 2002.

This application is related to the following co-pending U.S. patent applications, all of which have a common assignee and common inventors.

| SERIAL NUMBER | FILING DATE | DOCKET NUMBER | TITLE |
|---|---|---|---|
| 10/144595 | May 9, 2002 | CNTR.2176 | APPARATUS AND METHOD FOR EXTENDING A MICROPROCESSOR INSTRUCTION SET |
| 10/144592 | May 9, 2002 | CNTR.2186 | APPARATUS AND METHOD FOR CONDITIONAL INSTRUCTION EXECUTION |
| 10/227572 | Aug. 22, 2002 | CNTR.2187 | SUPPRESSION OF STORE CHECKING |
| 10/144593 | May 9, 2002 | CNTR.2188 | APPARATUS AND METHOD FOR SELECTIVE CONTROL OF CONDITION CODE WRITE BACK |
| 10/144590 | May 9, 2002 | CNTR.2189 | MECHANISM FOR EXTENDING THE NUMBER OF REGISTERS IN A MICROPROCESSOR |
| 10/227008 | Aug. 22, 2002 | CNTR.2190 | APPARATUS AND METHOD FOR EXTENDING DATA MODES IN A MICROPROCESSOR |
| 10/227571 | Aug. 22, 2002 | CNTR.2191 | APPARATUS AND METHOD FOR EXTENDING ADDRESS MODES IN A MICROPROCESSOR |
| | | CNTR.2192 | SUPPRESSION OF STORE CHECKING |
| 10/227583 | Aug. 22, 2002 | CNTR.2195 | NON-TEMPORAL MEMORY REFERENCE CONTROL MECHANISM |
| 10/144589 | May 9, 2002 | CNTR.2198 | APPARATUS AND METHOD FOR SELECTIVE CONTROL OF RESULTS WRITE BACK |

BACKGROUND OF THE INVENTION

1. Field of the Invention

This invention relates in general to the field of microelectronics, and more particularly to a technique for incorporating interrupt suppression features at the instruction level into an existing microprocessor instruction set architecture.

2. Description of the Related Art

Since microprocessors were fielded in the early 1970's, their use has grown exponentially. Originally applied in the scientific and technical fields, microprocessor use has moved over time from those specialty fields into commercial consumer fields that include products such as desktop and laptop computers, video game controllers, and many other common household and business devices.

Along with this explosive growth in use, the art has experienced a corresponding technology pull that is characterized by an escalating demand for increased speed, expanded addressing capabilities, faster memory accesses, larger operand size, more types of general purpose operations (e.g., floating point, single-instruction multiple data (SIMD), conditional moves, etc.), and added special purpose operations (e.g., digital signal processing functions and other multimedia operations). This technology pull has resulted in an incredible number of advances in the art which have been incorporated in microprocessor designs such as extensive pipelining, super-scalar architectures, cache structures, out-of-order processing, burst access mechanisms, branch prediction, and speculative execution. Quite frankly, a present day microprocessor is an amazingly complex and capable machine in comparison to its 30-year-old predecessors.

But unlike many other products, there is another very important factor that has constrained, and continues to constrain, the evolution of microprocessor architecture. This factor—legacy compatibility—accounts for much of the complexity that is present in a modern microprocessor. For market-driven reasons, many producers have opted to retain all of the capabilities that are required to insure compatibility with older, so-called legacy application programs as new designs are provided which incorporate new architectural features.

Nowhere has this legacy compatibility burden been more noticeable than in the development history of x86-compatible microprocessors. It is well known that a present day virtual-mode, 32-/16-bit x86 microprocessor is still capable of executing 8-bit, real-mode, application programs which were produced during the 1980's. And those skilled in the art will also acknowledge that a significant amount of corresponding architectural "baggage" is carried along in the x86 architecture for the sole purpose of retaining compatibility with legacy applications and operating modes. Yet while in the past developers have been able to incorporate newly developed architectural features into existing instruction set architectures, the means whereby use of these features is enabled—programmable instructions—have become scarce. More specifically, there are no "spare" instructions in certain instruction sets of interest that provide designers with a way to incorporate newer features into an existing architecture.

In the x86 instruction set architecture, for example, there are no remaining undefined 1-byte opcode values. All 256 opcode values in the primary 1-byte x86 opcode map are taken up with existing instructions. As a result, x86 microprocessor designers today must choose either to provide new features or to retain legacy compatibility. If new programmable features are to be provided, then they must be assigned to opcode values in order for programmers to exercise those features. And if spare opcode values do not remain in an existing instruction set architecture, then some of the existing opcode values must be redefined to provide for specification of the new features. Thus, legacy compatibility is sacrificed in order to make way for new feature growth.

There are a number of features that programmers desire in a present day microprocessor, but which have heretofore been precluded from incorporation because of the aforementioned reasons. One particular feature that is desirable for incorporation is interrupt suppression control at the instruction level.

Interrupts are employed in a present day microprocessor to couple the microprocessor to external devices that have time-critical interface requirements. Ordinarily, application programs execute on a microprocessor uninterrupted. And when an external device, such as a disk drive or network adapter, requires servicing by the microprocessor, the external device asserts an interrupt signal that is either directly or indirectly provided to the microprocessor to indicate that an event has occurred which requires a timely response. Accordingly, most microprocessors include provisions for interrupting normal program execution in order to service these external devices. Following processing of an interrupt, program control is normally returned to the point at which an executing program was interrupted.

Most present day microprocessors have one or more external interrupt signal pins that can be directly coupled to an external device or that can indirectly coupled to a number of external devices through a special purpose logic device called an interrupt controller. For the purposes of this application, it is sufficient to note that a typical interrupt controller is configured to communicate with its host microprocessor in such a manner as to provide a means for interfacing a significant number of external devices to the microprocessor via a small number of interrupt signal pins. For example, through a typical interrupt controller that communicates with a given microprocessor over two interrupt signal pins, over 200 external devices can assert interrupts to the given microprocessor, each of which are individually distinguished and serviced by the given microprocessor.

The processing of interrupts is a very complex task. When an interrupt occurs, a currently executing application program must be interrupted at a point where the state of execution can be saved during the period that the interrupt is being processed so that its state can be subsequently restored and program execution is allowed to continue. The state of an executing program is typically reflected in terms of the execution point, or instruction address, at which operation is suspended along with the values of all general purpose and system status registers that are associated with the executing program. Accordingly, when an interrupt occurs, it is necessary to allow a the currently executing program to complete execution of a current instruction, then to suspend operation of the program while saving a copy of the program's general purpose and system status registers along with the address of the next instruction that follows the current instruction. After these parameters are saved, program control in the microprocessor typically branches to an interrupt handler (also known as an exception handler) application that is generally part of the operating system program. The interrupt handler initiates transactions external to the microprocessor (typically over a system bus) to determine which external device asserted the interrupt signal pins. Upon determination, program flow is then diverted to a specific interrupt service application that performs those operations which are required to "service" the external device. Servicing the external device can involve virtually any type of operation such as reading or writing data to the device, updating special registers internal to the microprocessor, transferring blocks of data to or from memory, etc. When the interrupt has been serviced, then control is returned to the operating system which, in turn, restores the saved state of the interrupted application program and then transfers program control to the address of the next instruction.

The above description of interrupt processing is provided to enable the reader to appreciate the operations that are required to process a typical interrupt in a typical pipeline microprocessor. One skilled in the art will understand that individual microprocessor architectures differ in terms of the number of interrupt signal pins provided, the manner in which those signals are asserted, how devices communicate interrupts, the hierarchy of interrupts, the specifics of preserving and restoring the "state" of an interrupted application, at what point the application is suspended after an interrupt occurs, and the particular operating details of interrupt handlers that are provided for by each individual microprocessor architecture.

Because the handling of interrupts is so complex, present day microprocessors provide mechanisms that enable interrupt processing to be restricted to the operating system level. For instance, many microprocessor architectures have a programmable register to allow interrupts to be ignored when they occur. In an x86-compatable microprocessor, this programmable register takes the form of an interrupt enable flag bit within an x86 flags register internal to the x86-compatible microprocessor. When this bit is asserted, interrupts are processed. When this bit is not asserted, interrupts are ignored. This level of programmable control is provided to enable programmers to ensure that certain operations (i.e., certain sequences of instructions) can be accomplished without being interrupted. For example, when a particular interrupt occurs, the interrupt handler within an operating system will typically disable interrupts (via the flag bit) while the particular interrupt is being processed. After the particular interrupt is processed, the interrupt handler will set the interrupt enable bit, thus allowing any pending interrupts to be processed accordingly. To restrict programs other than the operating system from disabling and enabling interrupt processing, microprocessor architectures also provide a mechanism for precluding application programs from executing instructions that affect whether interrupts are enabled or disabled. An x86-compatable microprocessor allows programmers to assign one of four privilege levels to all programs executing on the microprocessor. Operating systems are typically assigned to the highest privilege level and application programs are assigned to the lowest privilege level. If an application program running at the lowest privilege level attempts to execute an instruction to disable interrupts, the x86 processor will detect this event and will prevent the instruction from being executed. Other microprocessor architectures employ different mechanisms for restricting control of interrupt processing only to those applications that are responsible for such tasks. It is sufficient herein to appreciate that the complex nature of interrupt processing in a present day microprocessor has resulted in features that preclude application programmers from determining if and when their application programs are suspended to for interrupt processing.

But there are a significant number of operations performed by application programs that require the uninterrupted execution of more than one program instruction. For example, in a system configuration that shares memory between a microprocessor and other devices, a multiple-instruction task that reads a value from a memory location, modifies the value, and writes the modified value back to the memory location could conceivably fail if the multiple-instruction task is interrupted after the value has been read from memory but prior to writing the value back to memory. This type of operation is referred to as a read-modify-write operation. Read-modify-write operations must be performed "atomically," that is, without interruption, to ensure proper program performance. As such, some microprocessor architectures provide a limited number of instructions that accomplish common atomic operations. In the x86 instruction set, a compare and exchange instruction (CMPXCHG) is provided that allows a programmer to direct a microprocessor to atomically compare a first operand read from a memory location to a register operand and, based upon the comparison result, to write either the first or the register operand back to the memory location. Another atomic instruction, XADD, enables a programmer to direct a microprocessor to read a first operand from a memory location, to exchange the first operand with a register operand, and to write the sum of the two operands back to the memory location.

Hence, some of the more common atomic operations that are required by application programs are provided for by atomic instructions within certain microprocessor instruction sets. Yet, there remain many other operations performed at the application program level that presently fail under the presence of interrupts because the operations require uninterrupted execution of a sequence of operations or instructions, yet application programmers have no way of ensuring that interrupts will not occur during the period when the sequence of operations or instructions is being executed. Application programmers are further limited to certain "atomic" instructions as alluded to above which may not effectively implement desired atomic operations because these atomic instructions are directed only to the performance of more common atomic operations.

Therefore, what is needed is an apparatus and method that incorporate suppression of interrupt features into an existing microprocessor architecture having a completely full opcode set, where incorporation of the interrupt suppression features allow a conforming microprocessor to retain the capability to execute legacy application programs while concurrently providing application programmers and/or compilers with the capability to control whether or not interrupt processing is performed on any given sequence of instructions.

SUMMARY OF THE INVENTION

The present invention, among other applications, is directed to overcoming these and other problems and disadvantages of the prior art. The present invention provides a superior technique for extending a microprocessor instruction set beyond its current capabilities to provide for instruction-level interrupt suppression features. In one embodiment an apparatus is provided, enabling macro instruction, level control of interrupt suppression within a microprocessor. The apparatus includes fetch logic, a translator, and extended execution logic. The fetch logic fetches an extended macro instruction from memory. The extended macro instruction includes instruction entities according to an existing instruction set, an extended prefix, and an extended prefix tag. The instruction entities include a first opcode within the existing instruction set that specifies first operations to be executed by the microprocessor, where a pending interrupt would otherwise be processed prior to completing execution of corresponding micro instructions. The extended prefix specifies that interrupt processing be suppressed until execution of the first operations is completed. The suppression of interrupt processing is specified at the application program privilege level. The application program privilege level precludes execution of operating system level instructions. The extended prefix tag is configured to indicate the extended prefix, where the extended prefix tag includes a second opcode within the existing instruction set, and where the second opcode, according to conventional translation rules, specifies second operations to be executed by the microprocessor. The translator is coupled to the fetch logic. The translator translates the extended macro instruction into the corresponding micro instructions. The extended execution logic is coupled to the translator. The extended execution logic receives the corresponding micro instructions, and completes execution of the corresponding micro instructions to perform the first operations prior to processing a pending interrupt.

One aspect of the present invention contemplates a microprocessor mechanism, for extending an existing instruction set to provide for selective suppression of interrupts. The microprocessor mechanism has fetch logic and a translator. The fetch logic fetches an extended macro instruction from memory. The extended macro instruction prescribes a first operation to be performed according to the existing instruction set, and prescribes that interrupt processing macro associated with the interrupts be suppressed until execution of the extended macro instruction is completed. The extended macro instruction prescribes the first operation and suppression of the interrupt processing at the application program privilege level. The application program privilege level precludes execution of operating system level instructions. The extended macro instruction includes a first opcode in the existing instruction set followed by an n-bit extended prefix, followed by remaining instruction entities. The first opcode indicates the extended macro instruction and the n-bit extended prefix prescribes suppression of interrupt processing. The remaining instruction entities include a second opcode according to the existing instruction set that specifies the first operation, where the first opcode, according to conventional translation rules, specifies a second operation to be performed according to the existing instruction set. The translator is coupled to the fetch logic. The translator receives the extended macro instruction and generates a micro instruction sequence directing a microprocessor to suppress processing of the interrupts until execution of the micro instruction sequence is completed.

Another aspect of the present invention comprehends an apparatus, for adding interrupt suppression features to an existing instruction set. The apparatus includes an escape tag, an interrupt suppression specifier, translation logic, and extended execution logic. The escape tag indicates that accompanying parts of a corresponding macro instruction prescribe a first operation to be performed according to the existing instruction set, where the corresponding macro instruction is fetched from memory for execution by a microprocessor, and where the escape tag is a first opcode within the existing instruction set that, according to conventional translation rules, specifies a second operation according to the existing instruction set. The interrupt suppression specifier is coupled to the escape tag and is one of the accompanying parts. The interrupt suppression specifier, prescribes that interrupt processing be suppressed through completion of the operation, and the accompanying parts further include a second opcode that prescribes the first operation. The translation logic receives the escape tag and the interrupt suppression specifier, and generates a micro instruction sequence directing the microprocessor to perform the first operation, and directs that interrupt processing be suppressed until the first operation is completed. The extended execution logic is coupled to the translation logic. The extended execution logic receives the micro instruction sequence, and performs the first operation through completion prior to processing a pending interrupt. The first operation is performed at the application program privilege level. The application program privilege level precludes execution of operating system level instructions.

A further aspect of the present invention provides a method for extending an existing instruction set architecture to provide for suppression of interrupt processing at the macro instruction level. The method includes fetching an extended macro instruction from memory, the extended macro instruction including an extended tag along with an extended prefix, where the extended tag is a first opcode entity that, under conventional translation rules, specifies a first operation according to the existing instruction set architecture; prescribing, via the extended prefix, that interrupt processing be suppressed during execution of the extended macro instruction, where remaining parts of the extended macro instruction prescribe that a second operation according to the existing instruction set be performed; at the application program privilege level, suppressing processing of an interrupt during execution of the extended macro instruction; and, at the application program privilege level, precluding the execution of operating system level instructions. The prescribing includes employing a second opcode entity according to the existing instruction set architecture to prescribe the second operation.

BRIEF DESCRIPTION OF THE DRAWINGS

These and other objects, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles discussed herein may be applied to other embodiments. Therefore, the present invention is not intended to be limited to the particular embodiments shown and described herein, but is to be accorded the widest scope consistent with the principles and novel features herein disclosed.

Figure 1:
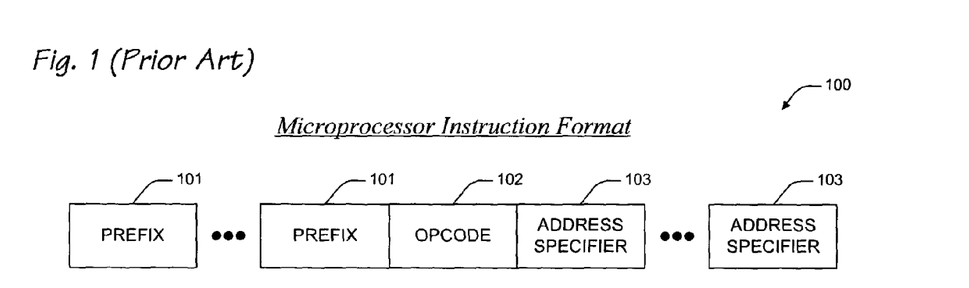
FIG. 1 is a block diagram illustrating a prior art microprocessor instruction format.
Figure 2:
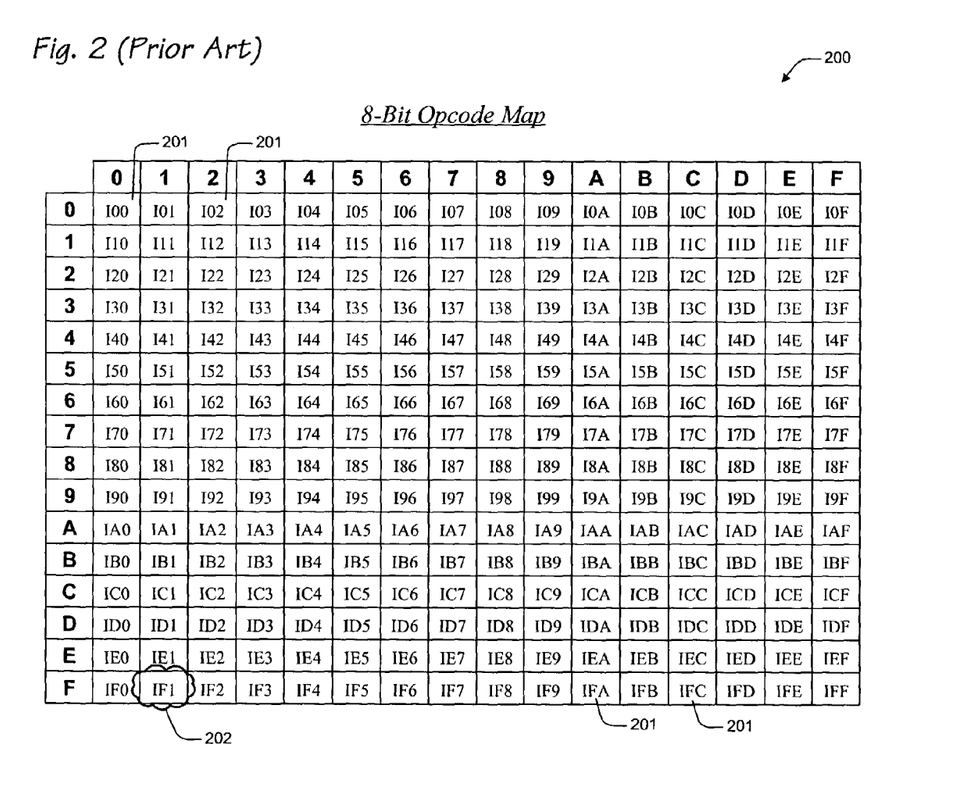
FIG. 2 is a table depicting how instructions in a instruction set architecture are mapped to logic states of bits in an 8-bit opcode byte within the instruction format of FIG. 1.

In view of the above background discussion on the techniques employed within present day microprocessors to extend the architectural features of those microprocessors beyond the capabilities of their associated instruction sets, a prior art example will now be discussed with reference to FIGS. 1-2. The discussion highlights the instruction set limitations that microprocessor designers routinely face today. On the one hand, they desire to incorporate more recently developed architectural features into a microprocessor design and, on the other hand, market conditions dictate that they must retain the capability to execute legacy application programs. In the example of FIGS. 1-2, a completely defined opcode map rules out the possibility of defining new opcodes for the exemplary architecture. Thus, the designers are compelled to choose either to incorporate the new features and sacrifice legacy compatibility to some extent, or to forego more recent architectural advances altogether in favor of maintaining the ability to execute older application programs. Following the related art discussion, a discussion of the present invention will be provided with reference to FIGS. 3-9. By employing an existing, yet obsolete, opcode as a prefix tag for an extended instruction that follows, the present invention enables microprocessor designers to overcome the limitations of completely full instruction set architectures, thereby allowing them to provide application programmers with the capability to direct a microprocessor to suppress interrupt processing for an individual instruction or for groups of instructions while concurrently retaining all the features that are required to run legacy application programs.

Turning to FIG. 1, a block diagram is presented illustrating a related art microprocessor instruction format 100. The related art instruction 100 has a variable number of instruction entities 101-103, each set to a specified value, that together make up a specific instruction 100 for a microprocessor. The specific instruction 100 directs the microprocessor to perform a specific operation such as adding two operands together, or moving an operand from memory to an internal register or to memory from the internal register. In general, an opcode entity 102 within the instruction 100 prescribes the specific operation to be performed, and optional address specifier entities 103 follow the opcode 102 prescribing additional information about the specific operation such as how the operation is to be performed, where the operands are located, etc. The instruction format 100 additionally allows a programmer to prefix an opcode 102 with prefix entities 101. The prefixes 101 direct the application of specified architectural features during the execution of the specific operation prescribed by the opcode 102. Typically, these architectural features can be applied to most of the operations prescribed by any of the opcodes 102 in the instruction set. For example, prefixes 101 in many present day microprocessors direct operations to be executed using different operand sizes (e.g., 16-bit, 32-bit). Accordingly, these processors are programmed to a default operand size (say, 32-bit), and prefixes 101 are provided in their respective instruction sets enabling programmers to selectively override the default operand size (say, to generate 16-bit operands) on an instruction-by-instruction basis. Selectable operand size is merely one example of an architectural feature that spans a significant number of the operations (e.g., add, subtract, multiply, Boolean logic, etc.) prescribed by opcodes 102 within many present day microprocessors.

One well-known instance of the instruction format 100 shown in FIG. 1 is the x86 instruction format 100, which is employed by all present day x86-compatible microprocessors. More specifically, the x86 instruction format 100 (also known as the x86 instruction set architecture 100) uses 8-bit prefixes 101, 8-bit opcodes 102, and 8-bit address specifiers 103. The x86 architecture 100 has several prefixes 101 as well, two of which override default address and data sizes of an x86 microprocessor (i.e., opcode states 66H and 67H), another which directs the microprocessor to interpret a following opcode byte 102 according to alternative translation rules (i.e., prefix value 0FH, which causes translation to be performed according to the so-called 2-byte opcode rules), and other prefixes 101 which cause particular operations to be repeated until repetition criteria are satisfied (i.e., the REP opcodes: F2H and F3H).

Referring now to FIG. 2, a table 200 is presented depicting how instructions 201 in an instruction set architecture are mapped to values of an 8-bit opcode byte 102 within the instruction format of FIG. 1. The table 200 presents an exemplary 8-bit opcode map 200 that associates up to 256 values of an 8-bit opcode entity 102 with corresponding microprocessor opcode instructions 201. The table 200 maps a particular value of an opcode entity 102, say value 02H, to a corresponding instruction opcode 201 (i.e., instruction I02201). In the particular case of the x86 opcode map, it is well known in the art that opcode value 14H is mapped to the x86 Add With Carry (ADC) instruction opcode, which directs that an 8-bit immediate operand be added to the contents of architectural register AL. One skilled in the art will also appreciate that the x86 prefixes 101 alluded to above (i.e., 66H, 67H, 0FH, F0H, F2H, and F3H) are actually opcode values 201 that contextually specify the application of certain architectural extensions to the operation prescribed by a following opcode entity 102. For example, preceding opcode 14H (normally, the ADC opcode discussed above) with prefix 0FH results in an x86 processor executing an Unpack And Interleave Low Packed Single-Precision Floating-Point Values (UNPCKLPS) operation instead of the Add With Carry (ADC). Features such as described in this x86 example are enabled in part in a present day microprocessor because instruction translation logic in the microprocessor interprets the entities 101-103 of an instruction 100 in order. Hence, the use of specific opcode values as prefixes 101 in instruction set architectures has, in past times, allowed microprocessor designers to incorporate a significant number of advanced architectural features into a complying microprocessor design without disadvantageously impacting the execution of older programs which do not employ those specific opcode states. For example, a legacy program that never uses x86 opcode 0FH will still run on a present day x86 microprocessor. And a newer application program, by employing x86 opcode 0FH as a prefix 101, can utilize a substantial number of x86 architectural features that have been more recently incorporated such as single instruction multiple data (SIMD) operations and conditional move operations.

The incorporation of architectural feature advances has been accomplished in the past through the designation of available (i.e. spare or unassigned) opcode values 201 as prefixes 101 (also known as architectural feature tags 101, feature indicators 101, or escape instructions 101). Yet, many instruction set architectures 100 have ceased to support the provision of enhancements for a very straightforward reason: all of the available or spare opcode values within those instruction sets 100 have been used up, that is, all of the opcode values in the opcode map 200 have been architecturally specified. When all of the available opcode values have been assigned as either opcode entities 102 or prefix entities 101, then there remain no more values to provide for the incorporation of new features. This significant problem exists in many microprocessor architectures today and consequently forces designers to choose between adding architectural features to a design and retaining compatibility with older programs.

It is notable that the instructions 201 shown in FIG. 2 are depicted generically (i.e., I24, I86) rather than specifically (i.e., Add With Carry, Subtract, Exclusive-OR). This is because fully occupied opcode maps 200 are presently precluding the incorporation of more recent architectural advances in a number of different microprocessor architectures. And although an 8-bit opcode entity 102 is alluded to in the example of FIG. 2, one skilled in the art will appreciate that the specific size of the opcode 102 is irrelevant in any sense other than its use as a specific case to teach the problem of a full opcode structure 200. Accordingly, a fully populated 6-bit opcode map would exhibit 64 architecturally defined opcodes 201 and prefixes 201 and would likewise provide no spare opcode values for expansion.

One alternative that stops short of entirely obliterating an existing instruction set and replacing it with a new format 100 and opcode map 200 is to substitute new instruction meanings for only a small subset of existing opcodes 201 that are presently used by application programs, say opcodes 40H through 4FH like those shown in FIG. 2. Under this hybrid technique, a conforming microprocessor operates exclusively in one of two operating modes: a legacy compatible mode, where opcodes 40H-4FH are interpreted according to legacy rules, or an enhanced mode, where opcodes 40H-4FH are interpreted according to enhanced architectural rules. This technique indeed enables designers to incorporate new features into a design, but when the conforming microprocessor is running in an enhanced mode it excludes execution of any application program that uses opcodes 40H-4FH. Hence, from the standpoint of retaining legacy compatibility, the legacy compatible-enhanced mode technique is not an optimum choice.

The present inventors, however, have noted the use frequency of certain opcodes 201 in instruction sets 200 having fully populated opcode spaces over the breadth of application programs composed for execution on compliant microprocessors. They have accordingly observed that there are some opcodes 202 which, although they are architecturally defined, are not employed within application programs that are capable of being executed by the microprocessors. Instruction IF1 202 is depicted in FIG. 2 as such an example of this singularity. In fact, the very same opcode value 202 (i.e., F1H) maps to a valid instruction 202 in the x86 instruction set architecture that is not presently employed by any extant application program. While the unused x86 instruction 202 is a valid x86 instruction 202 that directs an architecturally specified operation on an x86 microprocessor, it is not employed in any application program that can be executed on any present day x86 microprocessor. The particular x86 instruction 202 is known as In Circuit Emulation Breakpoint (i.e., ICE BKPT, opcode value F1H), and was formerly employed exclusively in a class of microprocessor emulation equipment that no longer exists today. ICE BKPT 202 was never employed in an application program outside of an in-circuit emulator, and the form of in-circuit emulation equipment that formerly employed ICE BKPT 202 no longer exists. Hence, in the x86 case, the present inventors have identified a means within a completely occupied instruction set architecture 200 whereby they can exploit a valid, yet obsolete, opcode 202 to allow for the incorporation of advanced architectural features in a microprocessor design without sacrificing legacy compatibility. In a fully-occupied instruction set architecture 200, the present invention employs an architecturally specified, yet unemployed, opcode 202 as a indicator tag for an n-bit prefix that follows, thus allowing microprocessor designers to incorporate up to $2^n$ more recently developed architectural features into an existing microprocessor design, while concurrently retaining complete compatibility with all legacy software.

The present invention exploits the prefix tag-extended prefix concept by providing an n-bit extended interrupt suppression specifier prefix whereby programmers are enabled to prescribe that interrupt processing be suppressed for a corresponding extended instruction through completion of its execution. An alternative embodiment of the present invention comprehends execution of the extended instruction and a specified number of following instructions to the preclusion of interrupt processing mechanisms in a microprocessor. The present invention will now be discussed with reference to FIGS. 3-10.

Figure 3:
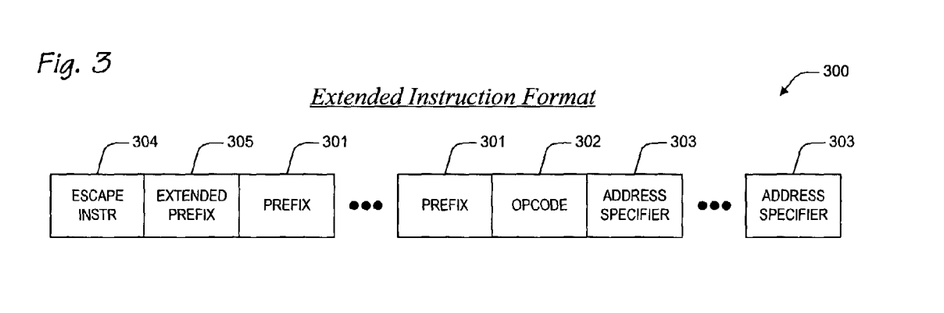
FIG. 3 is a block diagram featuring an extended instruction format according to the present invention.

Turning to FIG. 3, a block diagram is presented featuring an extended instruction format 300 according to the present invention. Very much like the format 100 discussed with reference to FIG. 1, the extended instruction format 300 has a variable number of instruction entities 301-305, each set to a specified value, that together make up a specific instruction 300 for a microprocessor. The specific instruction 300 directs the microprocessor to perform a specific operation such as adding two operands together, or moving an operand from memory to a register within the microprocessor. Typically, an opcode entity 302 in the instruction 300 prescribes the specific operation to be performed, and optional address specifier entities 303 follow the opcode 302 prescribing additional information about the specific operation such as how the operation is to be performed, registers where the operands are located, direct and indirect data to be used in computation of memory addresses for source/result operands, etc. The instruction format 300 also allows a programmer to prefix an opcode 302 with prefix entities 301 that direct the application of existing architectural features during the execution of the specific operation prescribed by the opcode 302.

The extended instruction 300 according to the present invention, however, is a superset of the instruction format 100 described above with reference to FIG. 1, having two additional entities 304, 305 which are optionally provided as an instruction extension to precede all remaining entities 301-303 in a formatted extended instruction 300. The purpose of the two additional entities 304, 305 is to provide the capabilities for programmers to specify that interrupt processing be suppressed, or precluded, for the extended instruction 300 of which the two additional entities 304, 305 are part. The optional entities 304, 305 are an extended instruction tag 304 and an extended interrupt suppression prefix 305. The extended instruction tag 305 is an otherwise architecturally specified opcode within a microprocessor instruction set. In an x86 embodiment, the extended instruction tag 304, or escape tag 304, is opcode value F1H, the formerly used, but not obsolete, ICE BKPT instruction. The escape tag 304 indicates to microprocessor logic that the extended prefix 305, or extended features specifier 305, follows, where the extended prefix 305 prescribes suppression of interrupts for the extended instruction 300. In one embodiment, the escape tag 304 indicates that accompanying parts 301-303, 305 of a corresponding instruction 300 prescribe an operation to be performed by the microprocessor. The interrupt suppression specifier 305, or extended prefix 305, specifies that the operation be performed atomically, that is, without interruptions caused by a pending interrupt which would otherwise be allowed by a conforming microprocessor. Extended execution logic in the microprocessor executes the operation through to completion, in the presence of a pending interrupt. Following completion of the operation, interrupt processing is re-enabled. In an alternative embodiment, the extended prefix 305 specifies that the operation spans a plurality of instructions, of which the extended instruction 300 is a first one of the plurality of instructions, and that the operation prescribed by the plurality of instructions must be performed through completion without suspension due to interrupt processing.

To summarize the instruction-level interrupt suppression technique according to the present invention, an extended instruction 300 is configured to prescribe an operation to be performed according to an existing microprocessor instruction set, where execution of the instruction is to be accomplished prior to processing a pending interrupt. The extended instruction 300 includes one of the opcodes 304 in the existing instruction set and an n-bit extended prefix 305. The selected opcode 304 serves as an indicator 304 that the instruction 300 is an extended features instruction 300 (that is, it prescribes extensions to the microprocessor architecture), and the n-bit features prefix 305 indicates that interrupt processing is to be suppressed. In one embodiment, the extended prefix 305 is 8-bits in size, providing for the specification of interrupt suppression for the instruction 300 and up to 255 following instructions, or a combination of interrupt suppression for a lesser number of instructions along with other extended features specified by remaining values of the 8-bit extended prefix 305. An n-bit prefix embodiment provides for the specification of up to $2^n$ instructions for interrupt suppression or combinations like those above.

Figure 4:
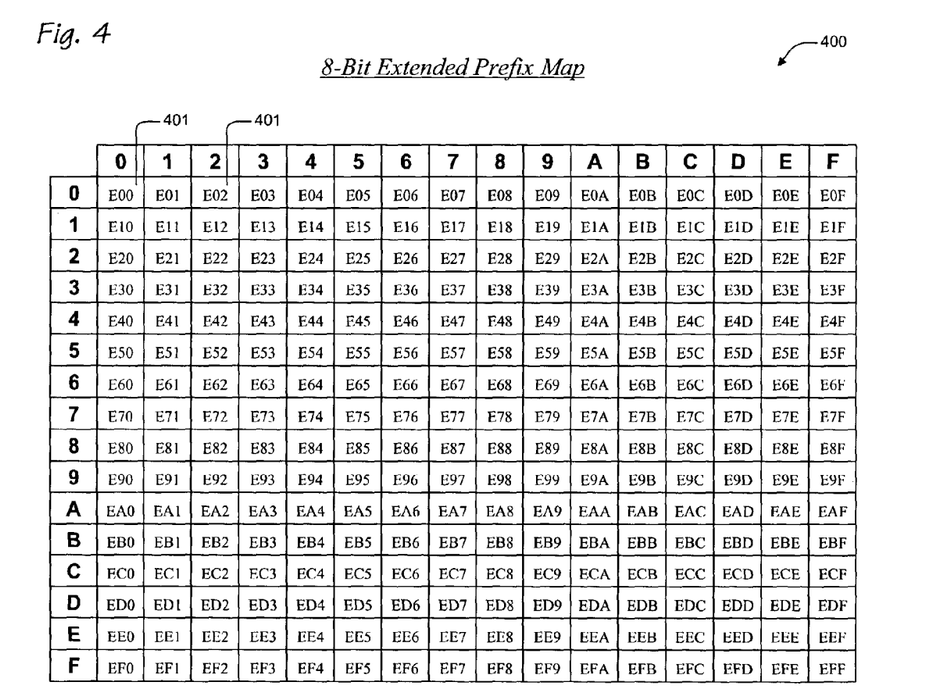
FIG. 4 is a table showing how extended architectural features are mapped to logic states of bits in an 8-bit extended prefix embodiment according to the present invention.

Now turning to FIG. 4, a table 400 is presented showing how interrupt suppression specifications are mapped to values in an 8-bit extended prefix embodiment according to the present invention. Similar to the opcode map 200 discussed with reference to FIG. 2, the table 400 of FIG. 4 presents an exemplary 8-bit extended prefix map 400 that associates up to 256 values of an 8-bit extended prefix entity 305 with corresponding interrupt suppression for a number of instructions 401 (e.g., E34, E4D, etc.) in a conforming microprocessor. In the case of an x86 embodiment, the 8-bit extended feature prefix 305 according to the present invention serves to provide for instruction-level control of interrupt suppression 401 (i.e., E00-EFF) which cannot be otherwise specified by the current x86 instruction set architecture.

The extended features 401 shown in FIG. 4 are depicted generically rather than specifically because the technique according to the present invention is applicable to a variety of different architectural extensions 401 and specific instruction set architectures. One skilled in the art will appreciate that many different architectural features 401, including those noted above, can be incorporated into an existing instruction set according to the escape tag 304-extended prefix 305 technique described herein. The 8-bit prefix embodiment of FIG. 4 provides for up to 256 different features 401, however, an n-bit prefix embodiment can allow for programming of up to $2^n$ different features 401.

Figure 5:
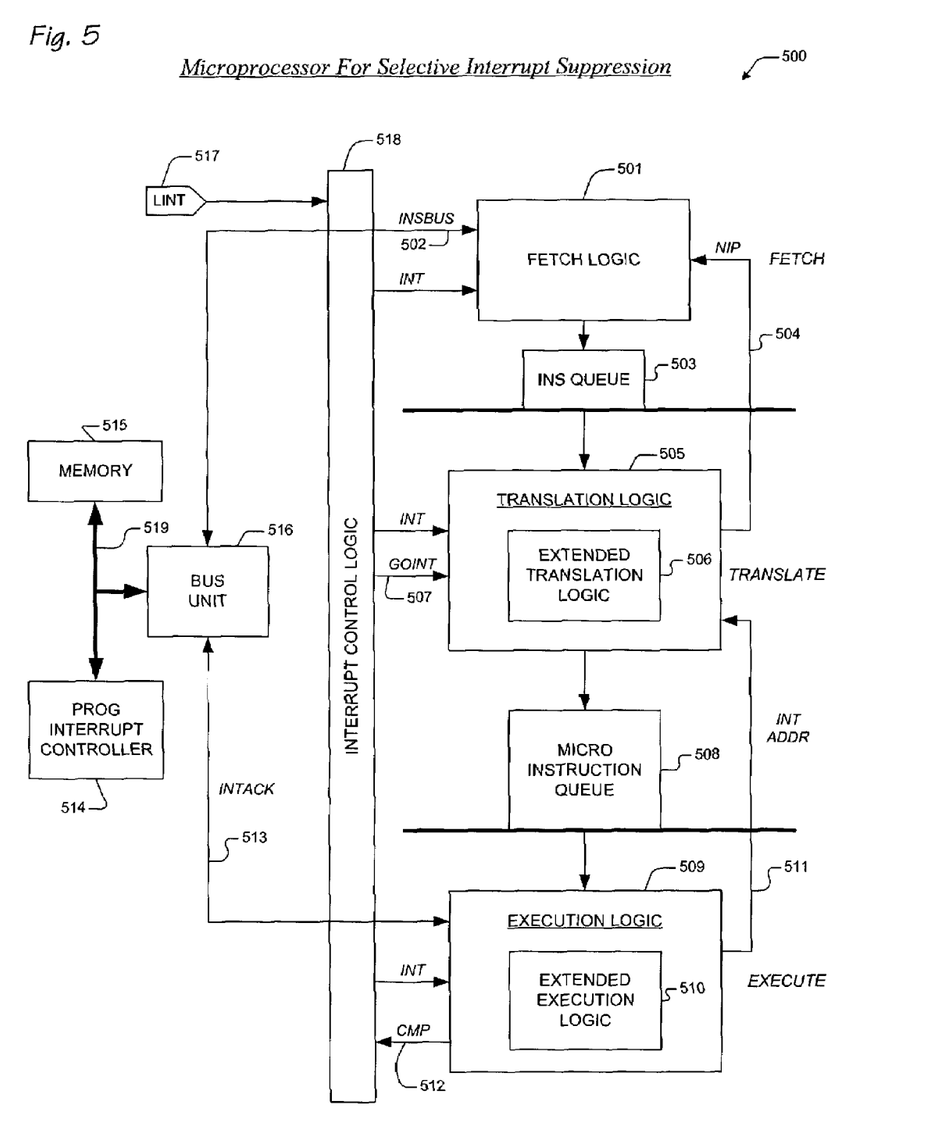
FIG. 5 is a block diagram illustrating a pipeline microprocessor for employing selective interrupt suppression control according to the present invention.

Now referring to FIG. 5, a block diagram is presented illustrating a pipeline microprocessor 500 for performing selective interrupt suppression according to the present invention. The microprocessor 500 has three notable stage categories: fetch, translate, and execute. The fetch stage has fetch logic 501 that is coupled to a bus unit 516 to retrieve instructions, or macro instructions, from memory 515 that is typically external to the microprocessor 500. The bus unit 516 is coupled to the memory 515 over a system bus 519. The retrieved macro instructions are provided by the fetch logic 501 to a macro instruction queue 503 for access by translation logic 505. The translation logic 505 is coupled to a micro instruction queue 508. The translation logic 505 includes extended translation logic 506. The execute stage has execution logic 509 having extended execution logic 510 therein.

In operation, the translation logic 505 provides a next instruction pointer, or address, NIP, to the fetch logic 501 via NIP bus 504. The fetch logic 501 issues the address of the next instruction to be fetched to the bus unit 516 over instruction bus 502. The bus unit 516 communicates with the memory 515 over the system bus 519 to retrieve macro instructions and provides these instructions to the fetch logic 501 via the instruction bus 502. One skilled in the art will appreciate that the drawing of FIG. 5 is simplified for clarity purposes and does not include known mechanisms employed in the art for caching of macro instructions such as an internal instruction cache (not shown). The fetch logic 501 in turn provides formatted instructions according to the present invention to the instruction queue 503 in execution order. The instructions are retrieved from the instruction queue 503 and are provided to the translation logic 505. The translation logic 505 translates each of the provided instructions into a corresponding sequence of micro instructions that directs the microprocessor 500 to perform the operations prescribed by the macro instructions. The extended translation logic 506 detects those instructions having an extended prefix tag according to the present invention and also provides for translation of corresponding extended interrupt suppression prefixes. In an x86 embodiment, the extended translation logic 506 is configured to detect an extended prefix tag of value F1H, which is the x86 ICE BKPT opcode. Extended micro instruction fields are provided in the micro instruction queue 508 to allow for the prescription interrupt suppression for operations prescribed by accompanying parts of the instruction. Alternative embodiments of the extended translation logic 506 allow for prescription of interrupt suppression in the extended micro instruction fields corresponding to a first macro instruction according to the present invention and a specified number of following macro instructions.

The micro instructions are provided from the micro instruction queue 508 to the execution logic 509, wherein the extended execution logic 510 is configured to execute specified operations prescribed by micro instructions. If an interrupt is asserted during execution of micro instructions that correspond to a translated macro instruction, interrupt control logic 518 in the microprocessor 500 senses assertion of the interrupt on one or more interrupt pins 517. The interrupt control logic 518 indicates to logic within the microprocessor that an interrupt is pending via signals INT. In the absence of extended instructions according to the present invention, the translation logic 505 initiates an interrupt processing sequence of events by issuing the interrupt handler's address to the fetch logic via bus 504. Concurrently, the execution logic 509 completes execution of a current micro instruction and the pipeline is flushed. Accordingly, the microprocessor 500 begins fetching, translating, and executing instructions to acknowledge the pending interrupt and to determine which device has asserted LINT 517. When these instructions are executed, the execution logic 509 issues an interrupt acknowledge bus cycle request to the bus unit 516 via INTACK bus 513. The bus unit 516 transacts the interrupt acknowledge bus cycle with a programmable interrupt controller 514 over the system bus 519 to determine the device that asserted LINT 517, which is typically communicated by an address of a specific interrupt service routine in the operating system (also known as an interrupt vector) that is designated to service the asserting device. The interrupt vector is retrieved by the bus unit 516 and provided to the execution logic 509 via the INTACK bus 513. The execution logic 509, in turn, provides this vector to the translation logic 505 via INT ADDR bus 511. The translation logic 505 issues the interrupt vector to the fetch logic 501 over the fetch bus 504 and the fetch logic 501 begins fetching instructions corresponding to the provided interrupt vector to process the acknowledged interrupt. For clarity purposes, the above description of interrupt processing is abbreviated to omit specific details on how an interrupted application's state is saved and restored. One skilled in the art will appreciated that such details are different according to the microprocessor architecture under which the present invention is employed.

When an extended instruction according to the present invention is fetched for execution, extended translation logic 506 within the translation logic 505 configures extended micro instruction fields (not shown) within corresponding micro instruction sequences to indicate that interrupt processing is to be suppressed until execution of the corresponding micro instruction sequences is completed. Accordingly, extended execution logic 510 within the execution logic 509 ensures that these micro instructions execute through to completion. When an interrupt is asserted via LINT 517 as described above, the translation logic 505 waits until the micro instructions have executed through to completion before initiating an interrupt handling sequence. The execution logic indicates that the micro instructions have completed execution by asserting signal CMP 512. The interrupt control logic 518 informs the translation logic 505 that execution is complete by asserting signal GOINT 507. When GOINT 507 is asserted, the translation logic initiates the interrupt handling sequence as described above.

Hence, the extended execution logic 510 indicates that interrupt processing can be initiated by asserting signal CMP 512 and this indication is provided to the translation logic 505 via signal GOINT 507. In the absence of an extended instruction according to the present invention, when an interrupt occurs via LINT 517, signal CMP 512 is asserted immediately following execution of a current micro instruction. In the presence of micro instructions corresponding to an extended instruction that directs suppression of interrupts, the extended execution logic 510 postpones assertion of signal CMP 512 until all of the micro instructions have completed execution.

As noted above, most microprocessor architectures have provisions for enabling and disabling the processing of interrupts, and that these provisions are typically exercised only at privilege levels not accorded to application programs. In an x86-compatible microprocessor, application programs are precluded from setting and clearing an interrupt enable bit (not shown) within an x86 flags register (not shown). But the present invention provides a mechanism for application programmers to direct the microprocessor 500 to disable interrupts on an instruction-by-instruction basis so that atomic operations can be performed without interruption. It is contemplated that specification of interrupt suppression according to the present invention overrides that prescribed by other architectural provisions for enabling and disabling interrupt processing. In an x86 embodiment, suppressing interrupts at the instruction level according to the present invention will override the interrupt enable bit within the flags register.

One skilled in the art will appreciate that the microprocessor 500 described with reference to FIG. 5 is a simplified representation of a present day pipeline microprocessor 500. In fact, a present day pipeline microprocessor 500 comprises upwards to 20-30 pipeline stages. However, these stages can be generally categorized into those three stage groups shown in the block diagram and thus, the block diagram 500 of FIG. 5 serves to teach the essential elements that are required to implement embodiments of the present invention as described hereinabove. Those elements of a microprocessor 500 which are extraneous to the present discussion, for clarity, are not depicted nor discussed.

Figure 6:
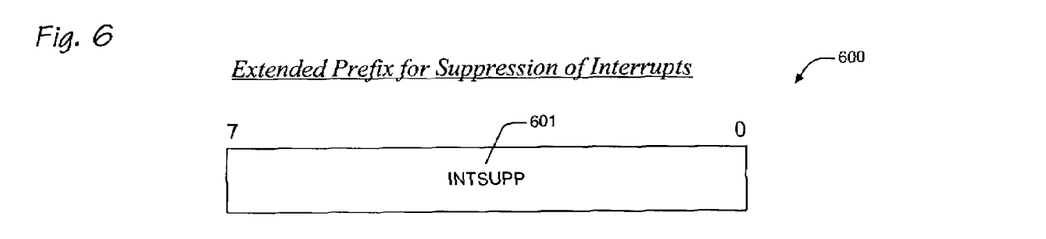
FIG. 6 is a block diagram featuring one embodiment of an extended prefix for prescribing that interrupt processing be precluded in a microprocessor according to the present invention.

Turning now to FIG. 6, a block diagram is presented featuring an exemplary embodiment of an extended prefix 600 for prescribing interrupt suppression for a corresponding extended instruction in a microprocessor 500 according to the present invention. The interrupt suppression prefix 600 is 8-bits in size and includes an interrupt suppression field 601. In one embodiment, the suppression field 601 prescribes that interrupt processing be precluded during execution of the corresponding extended instruction. An alternative embodiment comprehends the interrupt suppression field 601 specifying preclusion of interrupt processing for the corresponding extended instruction and up to 255 following instructions. The number of instructions to be executed during the period that interrupts are suppressed is indicated by the suppression field 601.

Figure 7:
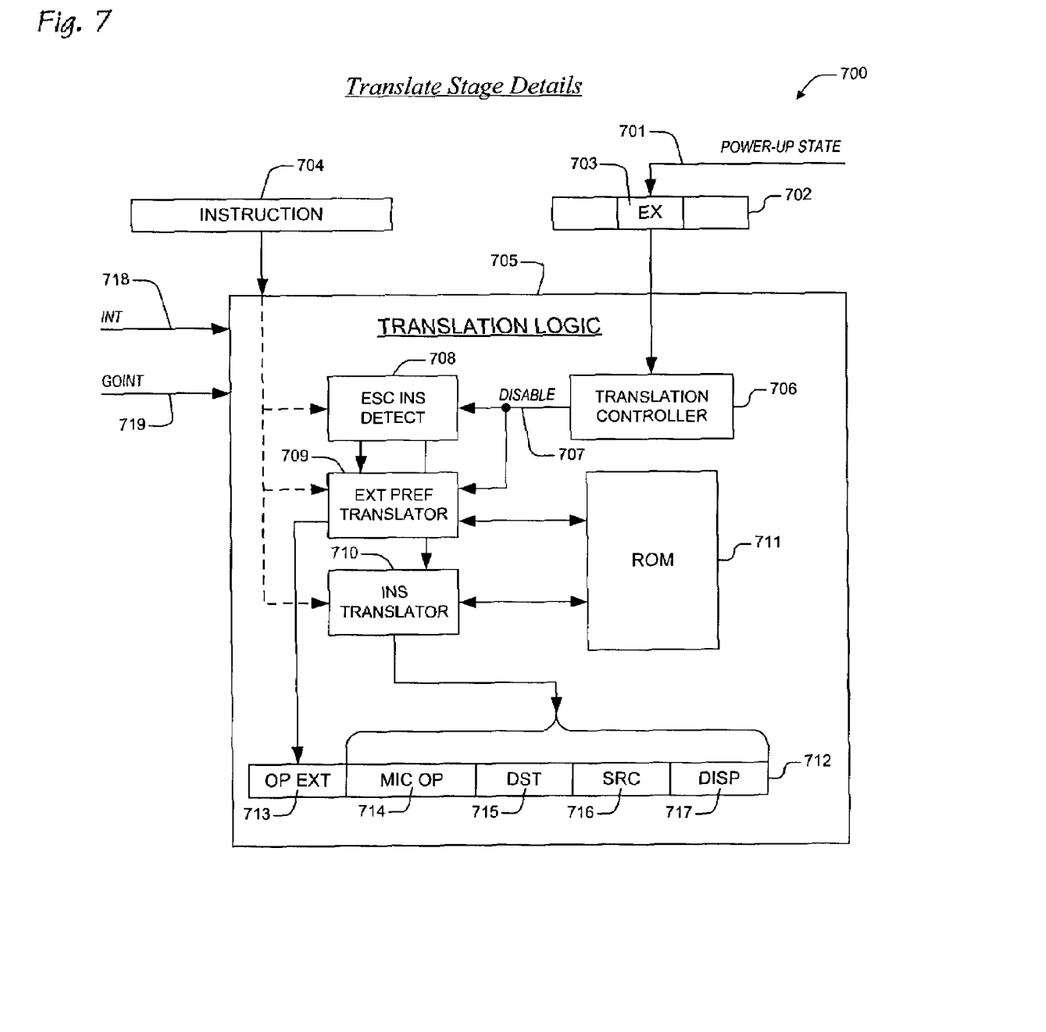
FIG. 7 is a block diagram featuring details of translation stage logic within the microprocessor of FIG. 5.

Referring to FIG. 7, a block diagram is presented featuring details of translate stage logic 700 within the microprocessor 500 of FIG. 5. The translate stage logic 700 has an instruction buffer 704 that provides an extended instruction to translation logic 705. The translation logic 705 is coupled to a machine specific register 702 having an extended features field 703. The translation logic 705 has a translation controller 706 that provides a DISABLE signal 707 to an escape instruction detector 708 and an extended prefix translator 709. The escape instruction detector 708 is coupled to the extended translator 709 and to an instruction translator 710. The extended translation logic 709 and the instruction translation logic 710 access a control read-only memory (ROM) 711, wherein are stored template micro instruction sequences that correspond to some extended instructions. The translation logic 705 also has a micro instruction buffer 712 having an opcode extension field 713, a micro opcode field 714, a destination field 715, a source field 716, and a displacement field 717.

Operationally, during power-up of the microprocessor, the state of the extended field 703 within the machine specific register 702 is established via signal power-up state 701 to indicate whether the particular microprocessor is capable of translating and executing extended instructions according to the present invention as described above. The machine specific register 702 provides the state of the extended features field 703 to the translation controller 706. The translation control logic 706 controls whether or not instructions from the instruction buffer 704 are translated according to extended translation rules or according to conventional translation rules. If extended features are disabled, then instructions having the opcode state selected as the extended features tag are translated according to the conventional translation rules. In an x86 embodiment having opcode state F1H selected as the tag, an occurrence of F1H under conventional translation results in an illegal instruction exception. With extended translation disabled, the instruction translator 710 translates all provided instructions 704 and configures all fields 713-717 of the micro instruction 712. Under extended translation rules, however, occurrence of the tag is detected by the escape instruction detector 708. The escape instruction detector 708 directs the extended prefix translator 709 to translate the extended prefix portion of the extended instruction according to extended translation rules and to configure the opcode extension field 713, thus directing that interrupt processing be suppressed for the micro instruction sequence corresponding to the extended instruction. In an alternative embodiment, the extended prefix translator 709 translates the extended prefix portion of the extended instruction according to extended translation rules and configures the opcode extension field 713 of all micro instructions associated with a sequence of macro instructions of which the extended instruction is the first instruction, where the extended prefix translator 709 has determined from an extended prefix that the extended instruction and a number of following macro instructions are to be executed atomically. The instruction translator 710 translates remaining parts of the extended instruction and configures the micro opcode field 714, source field 716, destination field 715, and displacement field 717 of the micro instruction 712. Certain instructions cause access to the control ROM 711 to obtain corresponding micro instruction sequence templates. Configured micro instructions 712 are provided to a micro instruction queue (not shown) for subsequent execution by the processor.

When the translation logic is informed via signal INT 718 that an interrupt is pending, translation continues until signal GOINT 719 is asserted, indicating that a currently executing sequence of atomic micro instructions has completed execution. When GOINT 719 is asserted, then the translation logic 705 initiates an interrupt handling sequence as described above. In all embodiments, the translation logic 705 completes translation of all macro instructions that are to be executed without interruption as prescribed by an extended prefix before initiating an interrupt handling sequence.

Figure 8:
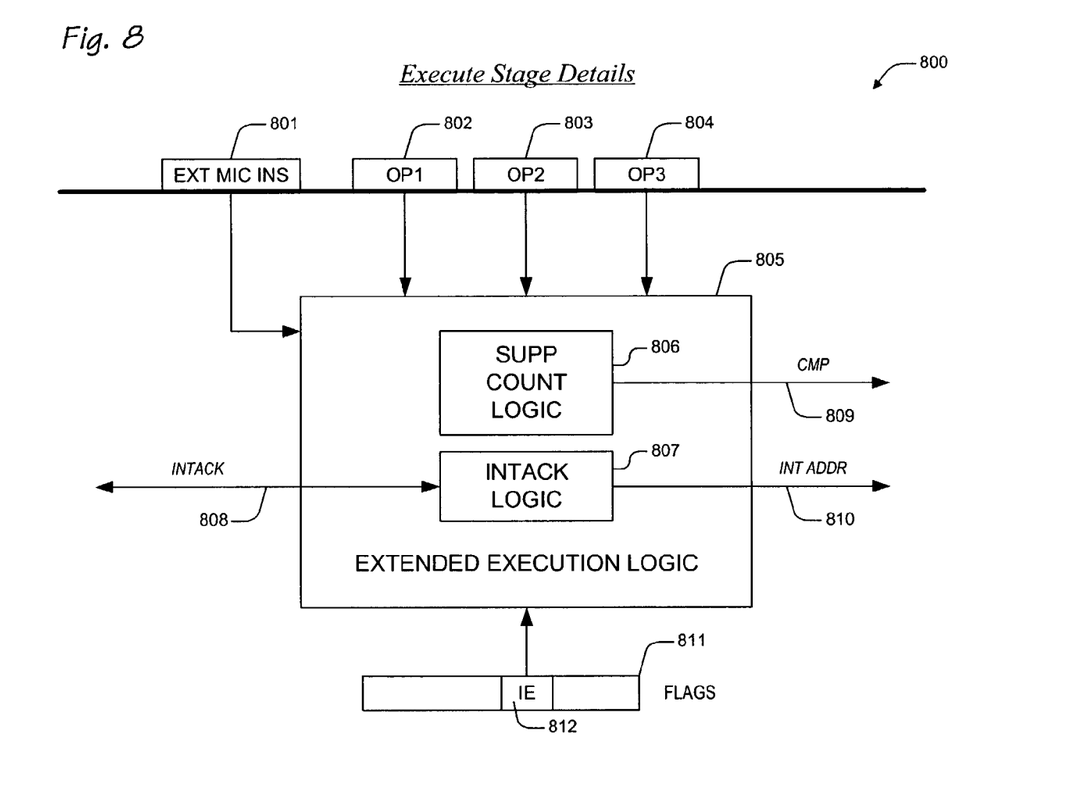
FIG. 8 is a block diagram illustrating details of execute stage logic within the microprocessor of FIG. 5.

Now referring to FIG. 8, a block diagram is presented illustrating execute stage logic 800 within the microprocessor 500 of FIG. 5. The execute stage logic 800 has suppression count logic 806 that generates signal CMP 809 and interrupt acknowledge logic 807 that initiates an interrupt acknowledge cycle via bus INTACK 808. From a previous stage of a microprocessor according to the present invention, the extended execution logic 805 receives micro instructions from an extended micro instruction buffer 801 and data operands from data buffers 802-804. In the exemplary embodiment shown in FIG. 8, the extended execution logic 805 also accesses an interrupt enable bit 812 in a flags register 811 to determine if operating system software has enabled interrupt processing.

Operationally, micro instructions along with their associated operands are provided for execution via the extended micro instruction buffer 801 and operand buffers 802-804. During execution of micro instructions corresponding to conventional macro instructions, the suppress count logic 806 ensures that signal CMP 809 remains asserted to indicate that interrupt processing can occur according to conventional interrupt processing rules. In one embodiment, if IE 812 is not asserted, indicating that interrupts are disabled, then CMP 809 is not asserted. When extended micro instructions are provided that direct interrupt suppression during their execution, the suppress count logic 806 waits until all the extended micro instructions have completed execution prior to asserting signal CMP 809. In one embodiment, an extended field (not shown) of a first micro instruction in an atomic micro instruction sequence indicates a number of micro instructions that are to be atomically executed without interruption. In this embodiment, the suppress count logic 806 also counts subsequent micro instructions as they are executed to ensure uninterrupted execution prior to asserting CMP 809. As noted above, prescription of interrupt suppression via an extended micro instruction overrides the state of IE 812 in the flags register 811. When an interrupt is being processed, the interrupt acknowledge logic 807 executes an interrupt acknowledge bus sequence via INTACK bus 808 to determine a pending interrupt's vector. This vector is provided to translation logic (not shown) via INT ADDR bus 810.

To summarize significant aspects of the present invention as has been described above with reference to FIGS. 3-8, a programmable tag-prefix combination is provided for in an extended instruction by employing an architecturally defined, yet obsolete, opcode as the tag. In one embodiment, the prefix directs a conforming microprocessor to suppress interrupt processing only for the extended instruction. In a different embodiment, the prefix directs the conforming microprocessor to suppress interrupt processing for the extended instruction and a specified number of following instructions. When the extended instruction is fetched, extended translation logic indicates that interrupt processing is to be suppressed for the instruction's corresponding micro instruction sequence via contents of opcode extension fields in extended micro instructions according to the present invention. In an alternative embodiment where the extended prefix prescribes that interrupt processing be suppressed for a corresponding extended instruction and a specified number of following instructions, the extended translation logic determines the number of following instructions that are to be executed atomically and configures extended micro instruction fields accordingly to ensure uninterrupted execution.

Consequently, programmers and/or automated code compilation devices are provided with a mechanism for directing a conforming microprocessor to suppress interrupt processing for single instructions or groups of instructions, thereby overcoming limitations of extant microprocessor instruction set architectures that relegate such matters to operating system routines. Application programmers are provided with a mechanism for flexibly programming atomic operations because they are not limited to using one or two special-purpose macro instructions that are specifically implemented to ensure atomicity.

Figure 9:
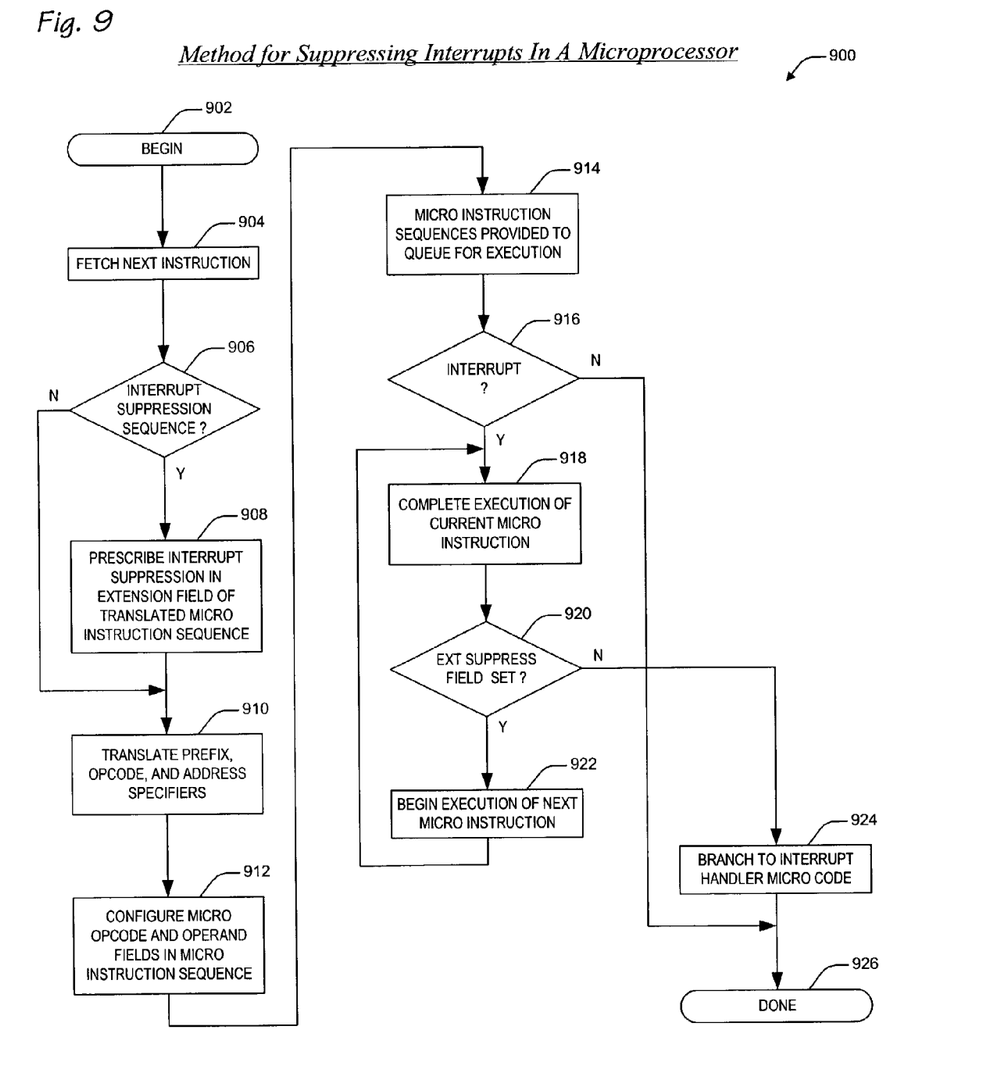
FIG. 9 is a flow chart depicting a method for suppressing interrupt processing associated with an instruction in a microprocessor according to the present invention.

Now referring to FIG. 9, a flow chart 900 is presented depicting a method for fetching, translating, and executing instructions that enable a programmer to suppress processing of interrupts within a microprocessor at the instruction level. Flow begins at block 902 wherein a program configured with extended feature instructions is provided to the microprocessor. Flow then proceeds to block 904.

At block 904, a next instruction is fetched for entry into the microprocessor's pipeline. Flow then proceeds to decision block 906.

At decision block 906, the instruction fetched in block 904 is evaluated to determine if an extended escape code-extended prefix sequence is provided for the instruction. In an x86 embodiment, the evaluation is made to detect opcode value F1 (ICE BKPT) followed by an interrupt suppression specifier entity. If the extended escape code and following entity are detected, then flow proceeds to block 910. If the escape code and extended specifier are not detected, then flow proceeds to block 908.

At block 908, the extended translation logic within the microprocessor prescribes in extension fields of a corresponding micro instruction sequence that interrupts are to be suppressed during execution of the corresponding micro instruction sequence. Flow then proceeds to block At block 910, all remaining parts of the instruction are translated to determine a prescribed operation, register operand locations, and memory address specifiers, along with the application of existing architectural features prescribed by prefixes according to the existing instruction set architecture. Flow then proceeds to block 912.

At block 912, the translation logic generates an extended micro instruction sequence that specifies the prescribed operation along with its corresponding opcode extensions. Flow then proceeds to block 914.

At block 914, micro instruction sequences are provided in execution order as they are processed by translation apparatus to a micro instruction queue for execution by the microprocessor. Flow then proceeds to decision block 916.

At decision block 1018, an evaluation is made to determine if an interrupt is pending. If not, then flow proceeds to block 926. If an interrupt is pending, then flow proceeds to block 918.

At block 918, execution of a current micro instruction is completed. Flow then proceeds to decision block 920.

At decision block 920, the extended suppression field of a following micro instruction is evaluated to determine if it is to be executed without interruption. If so, then flow proceeds to block 922. If not, then flow proceeds to block 924.

At block 922, since atomic operation has been detected in decision block 920, execution of the next micro instruction is initiated and flow proceeds to block 918 wherein the next micro instruction become the currently executing micro instruction.

At block 924, since an interrupt has been detected in block 916 and the extension field of a next micro instruction does not prescribe suppression of interrupt processing, translation logic within the microprocessor initiates a program control transfer to interrupt handler micro code to save the state of a currently executing application program prior to handling the pending interrupt. Flow then proceeds to block 926.

At block 926, the method completes.

Although the present invention and its objects, features, and advantages have been described in detail, other embodiments are encompassed by the invention as well. For example, the present invention has been described in terms of a technique that employs a single, unused, opcode state within a completely full instruction set architecture as a tag to indicate that an extended feature prefix follows. But the scope of the present invention is not limited in any sense to full instruction set architectures, or unused instructions, or single tags. On the contrary the present invention comprehends instruction sets that are not entirely mapped, embodiments having used opcodes, and embodiments that employ more than one instruction tag. For example, consider an instruction set architecture where there are no unused opcode states. One embodiment of the present invention comprises selecting an opcode state that is presently used as the escape tag, where the selection criteria is determined according to market-driven factors. An alternative embodiment comprehends employing a peculiar combination of opcodes as the tag, say back-to-back occurrences of opcode state 7FH. The essential nature of the present invention thus embodies use of a tag sequence followed by an n-bit extension prefix that allows a programmer/compiler to specify suppression of interrupt processing for individual instructions or groups of instructions in an existing microprocessor instruction set.

In addition, although a microprocessor setting has been employed to teach the present invention and its objects, features, and advantages, one skilled in the art will appreciate that its scope extends beyond the boundaries of microprocessor architecture to include other forms of programmable devices such as signal processors, industrial controllers, array processors, and the like.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. An apparatus, providing for macro instruction level control of interrupt suppression within a microprocessor, the apparatus comprising:
fetch logic, for fetching an extended macro instruction from memory, wherein said extended macro instruction comprises:
instruction entities according to an existing instruction set, wherein said instruction entities comprise a first opcode within said existing instruction set that specifies first operations to be executed by the microprocessor, and wherein a pending interrupt would otherwise be processed prior to completing execution of corresponding micro instructions;
an extended prefix, for specifying that interrupt processing be suppressed until execution of said first operations is completed, wherein suppression of interrupt processing is specified at an application program privilege level, and wherein said application program privilege level precludes execution of operating system level instructions; and
an extended prefix tag, configured to indicate said extended prefix, wherein said extended prefix tag comprises a second opcode within said existing instruction set, and wherein said second opcode, according to conventional translation rules, specifies second operations to be executed by the microprocessor;
a translator, coupled to said fetch logic, for translating said extended macro instruction into said corresponding micro instructions; and
extended execution logic, coupled to said translator, for receiving said corresponding micro instructions, and for completing execution of said corresponding micro instructions to perform said first operations prior to processing a pending interrupt.

2. The apparatus as recited in claim 1, further comprising:
a flags register, coupled to said extended execution logic, configured to prescribe that interrupt processing is enabled for the microprocessor, wherein specification of interrupt suppression by said extended prefix overrides that prescribed by said flags register.

3. The apparatus as recited in claim 1, wherein said extended execution logic comprises:
suppression count logic, configured to determine that execution of said corresponding micro instructions is completed.

4. The apparatus as recited in claim 1, wherein said translator determines that execution of said extended macro instruction is completed, and wherein said translator precludes processing of said pending interrupt.

5. The apparatus as recited in claim 1, wherein said extended prefix comprises 8 bits.

6. The apparatus as recited in claim 1, wherein said extended prefix comprises:
an interrupt suppression field, for specifying that interrupt processing be suppressed until execution of a plurality of macro instructions is completed, wherein said extended macro instruction is a first one of said plurality of macro instructions.

7. The apparatus as recited in claim 1, wherein said existing instruction set comprises a x86 instruction set.

8. The apparatus as recited in claim 1, wherein said extended prefix tag comprises opcode F1 (ICE BKPT) in a x86 instruction set.

9. The apparatus as recited in claim 1, wherein said translator comprises:
escape instruction detection logic, for detecting said extended prefix tag;
instruction translation logic, for determining said first operations to be performed by the microprocessor, and for prescribing said first operations within said corresponding micro instructions; and
extended translation logic, coupled to said escape instruction detection logic and said instruction translation logic, for prescribing within said corresponding micro instructions that interrupt processing be suppressed.

10. A microprocessor mechanism, for extending an existing instruction set to provide for selective suppression of interrupts, the microprocessor mechanism comprising:
fetch logic, for fetching and an extended macro instruction from memory, said extended macro instruction configured to prescribe a first operation to be performed according to the existing instruction set, and configured to prescribe that interrupt processing associated with the interrupts be suppressed until execution of said extended macro instruction is completed, wherein said extended macro instruction prescribes said first operation and suppression of said interrupt processing an the application program privilege level, and wherein said application program privilege level precludes execution of operating system level instructions, and wherein said extended macro instruction comprises a first opcode in the existing instruction set followed by an n-bit extended prefix, followed by remaining instruction entities, said first opcode indicating said extended macro instruction, said n-bit extended prefix prescribing suppression of interrupt processing, and said remaining instruction entities comprising a second opcode according to the existing instruction set that specifies said first operation, wherein said first opcode, according to conventional translation rules, specifies a second operation to be performed according to the existing instruction set; and
a translator, coupled to said fetch logic, and configured to receive said extended macro instruction, and configured to generate a micro instruction sequence directing a microprocessor to suppress processing of the interrupts until execution of said micro instruction sequence is completed.

11. The microprocessor mechanism as recited in claim 10, wherein said n-bit prefix comprises:
an interrupt suppression field, configured to specify that interrupt processing be suppressed until execution of a plurality of macro instructions is completed, wherein said extended instruction is a first one of said plurality of macro instructions.

12. The microprocessor mechanism as recited in claim 10, wherein said extended macro instruction directs said microprocessor to supersede interrupt enabling indications provided by a flags register.

13. The microprocessor mechanism as recited in claim 10, wherein said n-bit extended prefix comprises 8 bits.

14. The microprocessor mechanism as recited in claim 10, wherein the existing instruction set is a x86 microprocessor instruction set.

15. The microprocessor mechanism as recited in claim 10, wherein said first opcode comprises opcode ICE BKPT in a x86 microprocessor instruction set.

16. The microprocessor mechanism as recited in claim 10, wherein said translator comprises:
an escape instruction detector, for detecting said first opcode within said extended macro instruction;

an instruction translator, for translating said remaining instruction entities of said extended macro instruction to determine said first operation to be performed by said microprocessor; and an extended prefix translator, coupled to said escape instruction detector and said instruction translator, for translating said n-bit extended prefix, and for specifying suppression of interrupt processing until said micro instruction sequence has completed execution.

17. The microprocessor mechanism as recited in claim 10, further comprising:

extended execution logic, coupled to said translator, for receiving said micro instruction sequence, and for performing said first operation, and for indicating that execution of said micro instruction sequence is completed.

18. The microprocessor mechanism as recited in claim 17, wherein said extended execution logic comprises:

suppression count logic, configured to determine that execution of said corresponding micro instructions is completed.

19. The microprocessor mechanism as recited in claim 10, wherein said translator determines that execution of said extended macro instruction is completed, and wherein said translator precludes processing of the interrupts.

20. An apparatus, for adding interrupt suppression features to an existing instruction set, comprising:

an escape tag, indicating that accompanying parts of a corresponding macro instruction prescribe a first operation to be performed according to the existing instruction set, wherein said corresponding macro instruction is fetched from memory for execution by a microprocessor, and wherein said escape tag is a first opcode within the existing instruction set that, according to conventional translation rules, specifies a second operation according to the existing instruction set;

an interrupt suppression specifier, coupled to said escape tag and being one of said accompanying parts, prescribing that interrupt processing be suppressed through completion of said first operation, and said accompanying parts further comprise a second opcode that prescribes said first operation;

translation logic, for receiving said escape tag and said interrupt suppression specifier, and for generating a micro instruction sequence directing said microprocessor to perform said first operation, and for directing that interrupt processing be suppressed until said first operation is completed; and extended execution logic, coupled to said translation logic, for receiving said micro instruction sequence, and for performing said first operation through completion prior to processing a pending interrupt, wherein said first operation is performed at an application program privilege level, and wherein said application program privilege level precludes execution of operating system level instructions.

21. The apparatus as recited in claim 20, wherein said interrupt suppression specifier comprises 8 bits.

22. The apparatus as recited in claim 20, wherein the existing instruction set is a x86 instruction set.

23. The apparatus as recited in claim 20, wherein said first opcode comprises an ICE BKPT opcode in a x86 instruction set.

24. The apparatus as recited in claim 20, wherein said translation logic comprises:

escape tag detection logic, for detecting said escape tag, and for directing that said accompanying parts be translated according to extended translation conventions; and an instruction translator, coupled to said escape tag detection logic, for performing translation of instructions according to conventions of the existing instruction set, and for performing translation of said corresponding macro instruction according to said extended translation conventions to preclude interrupt processing until said first operation is completed.

25. A method for extending an existing instruction set architecture to provide for suppression of interrupt processing at the macro instruction level, the method comprising:

fetching an extended macro instruction from memory, the extended macro instruction including an extended tag along with an extended prefix, wherein the extended tag is a first opcode entity that, under conventional translation rules, specifies a first operation according to the existing instruction set architecture;

prescribing, via the extended prefix, that interrupt processing be suppressed during execution of the extended macro instruction, wherein remaining parts of the extended macro instruction prescribe that a second operation according to the existing instruction set be performed, and wherein said prescribing comprises:

employing a second opcode entity according to the existing instruction set architecture to prescribe the second operation;

at an application program privilege level, suppressing processing of an interrupt during execution of the extended macro instruction; and at the application program privilege level, precluding the execution of operating system level instructions.

26. The method as recited in claim 25, wherein said providing comprises employing an 8-bit entity to configure the extended prefix.

27. The method as recited in claim 25, wherein said providing comprises selecting the first opcode entity according to a x86 microprocessor instruction set architecture.

28. The method as recited in claim 25, wherein said providing comprises choosing a x86 ICE BKPT opcode as the extended tag.

29. The method as recited in claim 25, further comprising:

first translating the extended macro instruction into a micro instruction sequence that directs extended execution logic to perform the second operation and to suppress interrupt processing until the second operation has been performed.

30. The method as recited in claim 29, wherein said translating comprises:

within a translator, detecting the extended tag; and second translating the extended prefix and the remaining parts according to extended translation rules to generate the micro instruction sequence.

* * * * *